Feb. 1, 1927.  
J. A. GAGNON  
TIRE TOOL  
Filed Feb. 13, 1926  
1,616,362
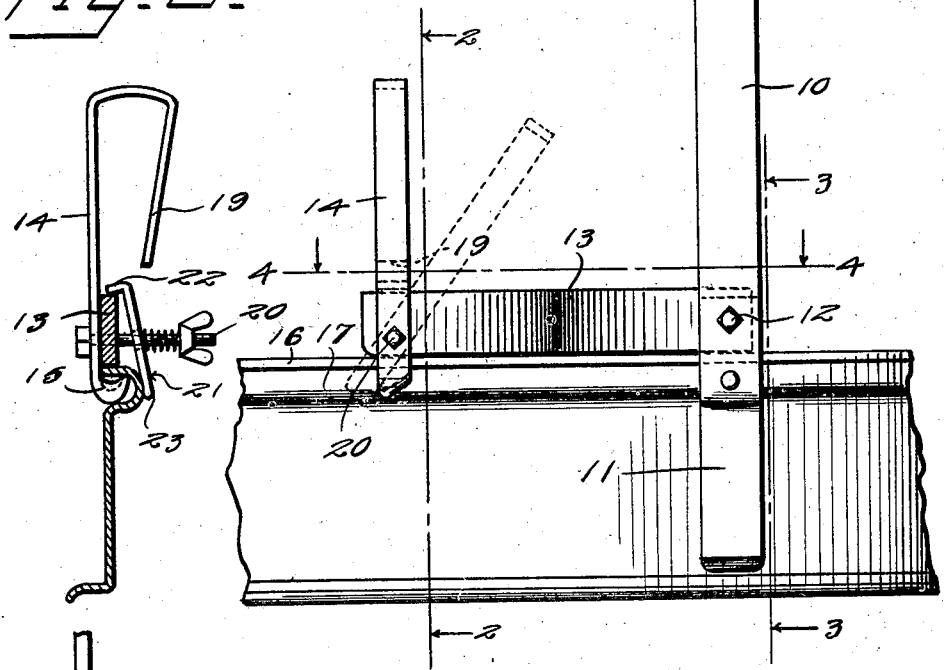
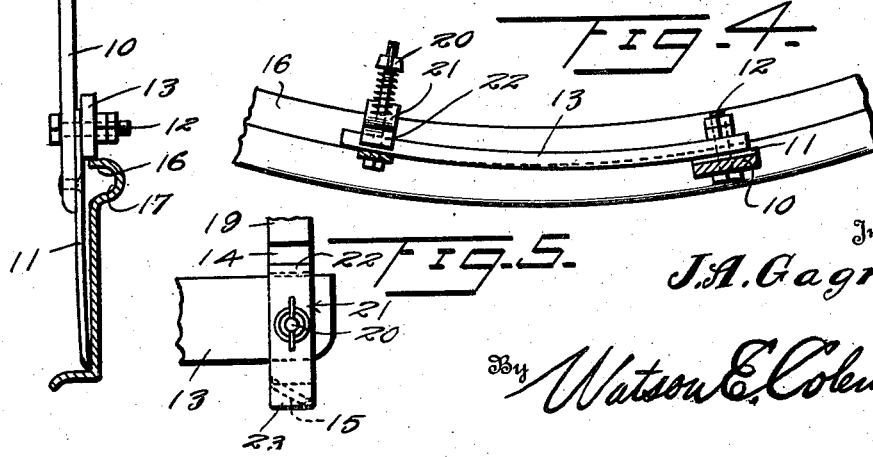
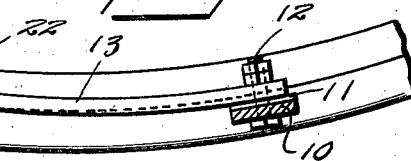
Inventor  
J.A. Gagnon.  
By Watson E. Coleman  
Attorney Patented Feb. 1, 1927.

1,616,362

UNITED STATES PATENT OFFICE.

JOSEPH A. GAGNON, OF MANCHESTER, NEW HAMPSHIRE.

TIRE TOOL.

Application filed February 13, 1926. Serial No. 88,115.

This invention relates to tire tools and more particularly to a tool for loosening the tire upon the rim.

An important object of the invention is to provide a device of this character including a part which may be forced between the tire and rim and a further part for engaging the rim and supporting the first named part so that it may be shifted between the tire and rim to completely free the same.

A further object of the invention is to provide a novel and improved locking mechanism for securing the support in adjusted position upon the tire rim, which locking mechanism will readily free the rim when pressure is removed therefrom so that the support and lock may be shifted to a fresh position upon the rim.

These and other objects I attain by the construction shown in the accompanying drawings, wherein for the purpose of illustration is shown a preferred embodiment of my invention and wherein:—

Figure 1 is a fragmentary side elevation of a tire rim showing a tire tool constructed in accordance with my invention applied thereto;

Figure 2 is a section on the line 2—2 of Figure 1;

Figure 3 is a section on the line 3—3 of Figure 1;

Figure 4 is a section on the line 4—4 of Figure 1;

Figure 5 is a rear elevation of the locking member.

Referring now more particularly to the drawings, the numeral 10 indicates a lever, one end of which is in the form of a relatively thin blade 11 which may be forced between the tire and the rim to which it is applied. To the lever adjacent the end 11, as at 12, is pivoted one end of a link 13, the opposite end of which has pivoted thereto a lock member 14. The lock is in the form of a bar, one end of which is formed with a hook 15 adapted to engage over the outer vertical flange 16 of the ring receiving groove 17 of a tire rim against the outer face of which the link 13 rests. In order that this link may properly engage against and position with relation to the rim flange while the blade 11 is engaged beneath the tire, the link is longitudinally curved, as shown. The upper end of the bar 14 is reverted in spaced relation to the bar, as at 19, and combines with the bar to provide a foot rest against which the foot of the operator may be engaged.

As a means for maintaining the hook in engagement in the groove of the flange, the pivot bolt 20 connecting the link 13 and bar 14 has slidably mounted thereon a bar 21, one end of which hooks over the upper face of the link 13, as at 22, and the opposite end 23 thereof opposes the bill of the hook. This end, in the applied position of the hook, engages the inner face of the rim.

In the operation of the device, a tire and rim are laid flatly upon the floor with the ring groove side of the rim uppermost. The blade 11 is then forced between the rim and the tire and the hook is engaged in the groove 17 with the link 13 abutting the outer wall of the groove. The foot of the operator is then placed upon the upper end of the bar 14 to force the same downwardly and to cause the hook to firmly engage the outer wall of this groove so that the link is held against circumferential movement upon the rim. The lever 10 is then oscillated and drawn toward the operator to its fullest extent. The pressure of the foot is then removed and the lever moved to a vertical position after which the foot is again applied and the operation above described repeated until the tool is passed entirely about the rim and the tire is completely freed therefrom. The tire may then be readily slipped from the rim.

Since the construction hereinbefore set forth is capable of a certain range of change and modification without materially departing from the spirit of the invention, I do not limit myself to such specific structure except as hereinafter claimed.

I claim:—

1. In a tire tool, a member having at one end a latch for securing the same to one edge of a tire rim, said member being arcuately curved in the general direction of curvature of the tire rim and a lever pivoted to the free end of the member and having one end thereof formed as a blade for insertion between a tire and rim.

2. In a tire tool, a member adapted to abut and conform to the curvature of one side wall of the tire, a bar pivoted to one end of the member and having a hook for engaging the interior face of a flange of the rim and a lever pivoted to the opposite end of the member and having one end thereof formed as a blade.

3. In a tire tool, a member adapted to abut and conform to the curvature of one side wall of the tire, a bar pivoted to one end of the member and having a hook for engaging the interior face of a flange of the rim, a lever pivoted to the opposite end of the member and having one end thereof formed as a blade and means engaging the inner face of the flange at the first named end of the lever for maintaining said hook in engagement with the inner face of said flange.

4. In a tire tool, a member adapted to slidably engage one side wall of a tire rim, a latch associated with the member for locking the member against movement upon the tire rim in one direction, the latch sliding upon the rim during movement of the rim in the opposite direction and a lever pivoted to the opposite end of the member and having one end thereof formed as a blade for insertion between a tire and rim.

5. In a tire tool, a member adapted to abut and conform to the curvature of one side wall of the tire, a bar pivoted to one end of the member and having a hook for engaging the interior face of a flange of the rim, a lever pivoted to the opposite end of the member and having one end thereof formed as a blade and means engaging the inner face of the flange at the first named end of the lever for maintaining said hook in engagement with the inner face of said flange, said hook having a flat rim engaging bill, said bill being arranged at an angle to the bar whereby said hook tends to lock against the rim during movement of the bar in one direction and to disengage therefrom during movement of the bar in the opposite direction.

In testimony whereof, I hereunto affix my signature.

JOSEPH A. GAGNON.